BEST AVAILABLE COPY
J. N. Olney.
Heating Stove.
7,893 X
Patented Dec. 26. 1833.
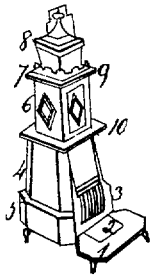
Inventor;
Jas. N. Olney
N. PETERS, PHOTO-LITHOGRAPHER, WASHINGTON, D. C.

7893X  a. 14  Dec 26, 1833  371.

James A. Olney, Providence R. I.

Letters Patent

The schedule referred to in these Letters Patent and making part of the same containing a description in the words of the said James A. Olney him self of his improvement called "Olney's Anthracite Coal Furnace."

Be it known that I James A. Olney of Providence in the County of Providence and State of Rhode Island have made a new and useful improvement in the useful arts, called Olney's Anthracite Coal Furnace, which is described as follows:-

The first modification of my improvement in stoves for burning Anthracite coal I call the [illegible] or Grecian Pattern and is divided thus - It consists of a base or bottom plate on which the upper part of the stove rests; a pot or vessel to contain the fuel with a grate in front, the upper chamber through which the fuel is put and in which the caloric is distributed, the ash pan and flue; the ornamental [illegible] upon the top to contain water; and the dovetailed feet upon which the furnace rests.

The base or bottom plate is cast with an opening in its centre thro which the ashes fall from the grate into the ash pan; and to admit the flue which [illegible] down, having two parallel ribs or grooves cast on its under side to admit the ash pan, and four dovetailed grooves to admit the four legs on which it rests and the round [illegible] for screws to connect it with the fuel chamber.

The pot or vessel to contain the fuel with a grate in front is made of cast iron and lined with clay; it is in the form of the lower section of a pyramid its base being the bottom of the stove; and is of any required dimensions. Flanges are cast on the bottom having holes in them through which the screws pass to secure it to the bottom plate. A plate having an opening in it to receive the figure made by the upper part of the fuel chamber is fastened on the top of the fuel chamber by screws passing thro the plate and [illegible] cast on the top of the pot or fuel chamber.

[illegible]

7893X

The grate is movable and can be taken out to clean the stove. The upper
Chamber [illegible] which the fuel is put and by which the Calorie is distributed
equally is formed by four plates of cast iron properly jointed ornamented
with Grecian devices and united together by the bottom plate before mention
and a top plate having an opening in it similar to that in the bottom plate
In one of these plates is an opening with [illegible] [illegible] to receive a smoke pipe.
The [illegible] are to prevent Coal getting into the Pipe.
The ash pan [or box] is made of sheet iron of a rectangular figure
open at top having flanges which slide in the grooves in the under side of
the bottom plate. The Blower is a plate of cast iron in shape to correspond
with the opening in the fuel Chamber for the grate and [illegible] on two projections
or points cast on it in grooves or Cavities left in the lower plate. When it is turned
up it acts as a blower to ignite the fuel by closing the opening in front of the
grate and when turned down it forms the hearth, over the opening in
the bottom plate above the ash box and which it is also made to fit.
The ornamental Vessel on the top to contain water is made of cast
iron of a square figure with or without a square plate to stand on forming
the cover of the stove and can be removed at pleasure to admit fuel.
There are four dove tail feet made of cast iron which slide in the dove
-tail grooves in the under side of the bottom plate.
The large or Gothic pattern is in principle the same as the before
described Grecian pattern with this difference that instead of the iron
Chamber for distributing the heat as before described there is a [illegible]
of a [illegible] hollow cone made of cast iron and placed over a round op
-ening in the top plate of the [illegible] Chamber for the fuel; and, a [illegible]
made of cast iron with open gothic fret work, forming a Chamber for dis
-tributing the Calorie or heat ornamented with gothic ornaments.
There are four pieces Cast iron Buttresses
which unite the four plates of the fret work at the four angles by means of
iron rods passing through them; on the tops of these are four pinnacles [illegible]
at the lower ends and made hollow to receive the tops of the rods. the heads of
the [illegible] forming the caps or tops of the pinnacles. On the top is placed a square
plate for closing in the top of the stove like the former ornamented with a p

7893X

-propriate [illegible] [illegible]. The flue is attached to the [illegible] and in it is fixed a swinging damper.

Operation. The water vessel at top and [illegible] plate beneath it being removed a small quantity of kindling, such as shavings, wood or charcoal are put into the pot or fuel chamber through the top. Upon this is put the Anthracite coal. The kindlings being lighted the blower or damper is brought up in front of the grate, which increases the draught of air and raises up the fire which ignites the anthracite coal. When the coal is sufficiently ignited the blower or damper is turned down and the fire managed in the usual way.

The advantages arising from the before described manner of constructing stoves for burning Anthracite Coal consists chiefly in having the Chamber of Combustion lined with fire clay on which the Caloric is retained or distributed in the most econom-ical manner. Whilst the upper Chamber being of cast iron only suffers the heat to pass quickly through it to warm the room. Besides the non-conducting fire clay lining at the bottom of the Chamber of Combus-tion enables you to preserve fire in a very small quantity if necess-ary and for a long time.

My invention here claimed and desired to be secured by Letters Patent consists in the peculiar construction of the Anthracite Coal burners and their several parts as before described and particularly the lining of the Chamber of Combustion with fire clay so as to retain or distribute the Caloric or heat with the greatest economy. Also the manner of fitting the door or blower to make part of the [illegible] when opened or turned down.

For a further illustration of my invention I refer to the models and drawings of the same deposited in the [illegible] office. Done at Providence the 13 day of November 1833

Witnesses
[illegible] C Eaton
Nathaniel Searle
1260 [illegible]

Thomas [illegible] [illegible]

[illegible]
ChfW.

(Drawing in portfolio)

Patented 30 Dec 1833